UNITED STATES PATENT OFFICE.

WM. R. THOMAS AND MORGAN EMANUEL, JR., OF CATASAUQUA, PA.

IMPROVED BLASTING-POWDER.

Specification forming part of Letters Patent No. 34,654, dated March 11, 1862.

*To all whom it may concern:*

Be it known that we, W. R. THOMAS and M. EMANUEL, Jr., both of Catasauqua, in the county of Lehigh and State of Pennsylvania, have invented a new and useful Improvement in Blasting Compounds; and we do hereby declare that the following is a full, clear, and exact description of the same.

This invention relates to an improvement in the blasting compound for which we obtained Letters Patent dated April 9, 1861. That compound was composed of nitrate of soda, sulphur, and ground bark, worked up together into a paste by the aid of a suitable quantity of water, and afterward dried. We have found by subsequent experiment that by the addition of a certain quantity of chlorate of potash the quality of the compound is much improved, inasmuch as by the supply of additional oxygen it makes it burn quicker and increases its strength; and this invention consists in a compound made of nitrate of soda, sulphur, ground bark, and chlorate of potash.

The proportions of the several ingredients and mode of preparing the compound are as follows: Take of nitrate of soda, three and a half ($3\frac{1}{2}$) pounds; flowers of sulphur, one and a quarter ($1\frac{1}{4}$) pound; ground bark, four and a half ($4\frac{1}{2}$) pounds; chlorate of potash, two (2) pounds; water, three (3) quarts. Heat the water to the boiling-point and dissolve therein the nitrate of soda and the chlorate of potash. While this solution is hot introduce the bark and stir till the latter is perfectly saturated, and then add the sulphur and stir till the whole is well mixed, after which the compound only requires to be well dried to make it ready for use.

We will remark that the proportions of the several ingredients of the compound may be varied to some extent without materially changing the character or efficiency of the compound; but the proportions we have stated are those which after repeated experiment we have found to be the best.

The compound is used in blasting in the same manner as ordinary blasting-powder.

What we claim as our invention, and desire to secure by Letters Patent, is—

The blasting compound made of nitrate of soda, sulphur, ground bark, and chlorate of potash, in the manner substantially as and in about the proportions herein set forth.

WILLIAM R. THOMAS.
MORGAN EMANUEL, JR.

Witnesses:
DANIEL MILSON,
CHAS. CORWIN.